United States Patent Office 2,917,371
Patented Dec. 15, 1959

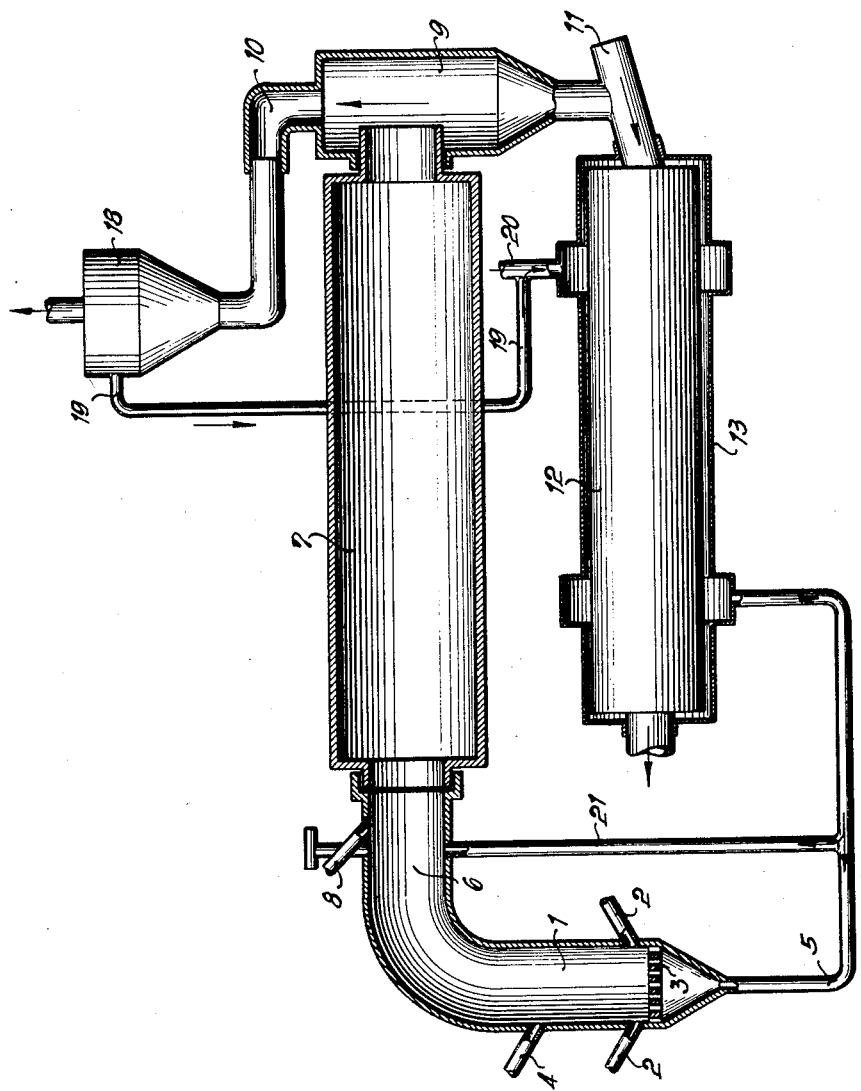

2,917,371

APPARATUS FOR THE CONTINUOUS MANUFACTURE OF CALCIUM CYANAMIDE

Thomas Fischer, Trostberg, Hermann Kronacher, Feldkirchen, near Trostberg, and Franz Kaess, Trostberg, Germany, assignors to Suddeutsche Kalkstickstoff-Werke A.G., Trostberg, Germany Application October 17, 1955, Serial No. 540,854

4 Claims. (Cl. 23—262)

The invention relates to the manufacture of calcium cyanamide.

In the continuous preparation of calcium cyanamide by reacting calcium carbide with nitrogen in a rotary kiln, it is difficult to obtain satisfactory results, because the charge tends to cake and the obtained product requires further processing to become suitable for many of its applications.

It is a principal object of the invention to provide an improved continuous process which yields calcium cyanamide in a form immediately available for use.

It is another object of the invention to provide an apparatus suitable for carrying out our new process.

Other objects and advantages will be apparent from a consideration of the specification and claims.

According to our invention, the nitrogenation of calcium carbide is started in a turbulence reactor and completed in a rotary kiln. We have found that it is almost impossible to obtain complete conversion by nitrogenating calcium carbide floating in a nitrogen current; the end product still contains unreacted carbide. But if the obtained partially nitrogenated product is passed into a rotary kiln, complete nitrogenation is readily obtained and no caking is observed. The charge remains in the rotary kiln until it has obtained a nitrogenation degree of about 90 percent; this requires a length of contact time with nitrogen which cannot be obtained in the turbulence process, even though the passage of nitrogen through the turbulence layer may be repeated once or twice.

The invention will be set forth in more detail with reference to the accompanying drawing illustrating a preferred form of apparatus for carrying out the process of the invention.

In the drawing, the reference numeral 1 designates a turbulence reactor, which is heated up at the start of the process and filled through the inlet 2 with calcium carbide, which first settles on the grid 3. Below the grid 3, the reactor forms a cone, into the bottom of which opens a pipe 5 for the introduction of nitrogen. The nitrogen whirls up the carbide lying on the grid 3, and the carbide-nitrogen mixture passes through the passage 6 into the rotary kiln 7, the diameter of which is larger than that of the passage 6. Due to said enlarged diameter, the rate of flow of the gas decreases and the carbide carried by the gas is deposited on the walls of the kiln 7 and is completely nitrogenated during its passage through the kiln. Calcium cyanamide already formed in the reactor 1 is also deposited on the walls of the kiln, but because of its lower specific gravity in zones farther removed from the passage 6. In order to control the developed heat of reaction and to modify the carbide concentration in the nitrogen current, fresh calcium cyanamide may be supplied through the inlet 8; said added calcium cyanamide is mixed with the glowing hot carbide, precipitates the same and distributes it so as to prevent caking of the carbide particles. If the temperature in the reactor 1 or in the passage 6 rises above the desired level, for instance due to an excessive carbide content of the charge, calcium cyanamide may be added already through the inlet 4. No heat is carried off by the walls of the reactor 1, but the entire heat is carried into the kiln 7 and is removed by admixture with calcium cyanamide only so far as required to maintain by admixture with calcium a reaction temperature of about 1000–800° C. in the kiln 7.

After complete nitrogenation in the kiln, the charge passes through the discharge chamber 9 and the chute 11 into a cooler 12 and leaves said cooler at a temperature below 100° C., so that no further reaction can take place.

The economy of the entire process is essentially controlled by the rate of consumption of the nitrogen. As the turbulence process requires much more nitrogen as the conventional procedure, it is necessary to recycle said excess nitrogen. For this purpose, the effluent gas is passed through the flue 10 into a dust collector 18, from where it flows through a return conduit 19 into the cooling jacket 13 of the cooler 12; in this way, the nitrogen serves as cooling agent for the discharged material and is inversely heated up for its re-use. An inlet 20 serves to introduce fresh nitrogen into the cooling jacket 13. The nitrogen returns from said cooling jacket into the reactor 1. A conduit 21 serves to introduce nitrogen into the passage 6 to prevent obstruction therein by deposited material.

At the transfer from the turbulence reactor into the rotary kiln, the calcium carbide charge should have a nitrogenation degree of at least 50, preferably of about 90 percent and more. The product leaving the rotary kiln 7 is substantially free of carbide and ready for use without any processing.

A particular advantage of our method is that not yet nitrogenated materials, because of its higher specific gravity, remains longer in the rotary kiln than the material already partially nitrogenated in the reactor 1. The heat of reaction developed in the reactor 1 is essentially utilized for the after-reaction in the kiln.

The following example is given to illustrate a preferred method of carrying out the invention, it being understood that the invention is not limited to the details set forth in the example. Parts are given by weight unless specified otherwise.

*Example*

A turbulence reactor having an inner diameter of about 1.5 m. and a height of about 4 m. was charged with 3 metric tons per hour of a mixture consisting of

|  | Percent |
|---|---|
| Calcium carbide (80%) | 78 |
| Calcium cyanamide | 20 |
| Fluospar | 2 |

The particle size of the charge was adjusted to a passage of 85% through a screen of 4900 meshes/cm.$^2$.

3300 m.$^3$ per hour of nitrogen were injected into the bottom of the reactor, which were sufficient to obtain nitrogenation, turbulence, and transfer of the charge into the rotary kiln.

The average time of passage of the charge through the reactor was about 20 min. Theoretically, this time should be sufficient to obtain complete nitrogenation at about 1000° C. In practice, this is not the case, because a certain amount of particles is carried off by the nitrogen curent before they are nitrogenated, and the material leaving the reactor contains still about 1.5 to 5 percent of residual carbide. Said carbide is nitrogenated while the material travels slowly through the rotary kiln, where it remains about 3 to 4 hours. The charge withdrawn from the end of the kiln is substantially free of any calcium carbide.

The dimensions of the kiln used in this example were: Inner diameter 2.5 m.; length 11 m. The temperature at the feed end of the kiln was about 980 to 1020° C., at its discharge end about 850 to 900° C.

What we claim is:

1. An apparatus for the continuous nitrogenation of calcium carbide comprising a stationary vertical turbulence reactor, a grid in the bottom portion of said reactor and extending over the whole cross-section thereof, lateral inlets above said grid to charge calcium carbide into said reactor, a substantially horizontal rotary kiln of larger diameter than said reactor, the upper end of said reactor being bent and discharging directly into said kiln, a cooler receiving the material discharged from the kiln, a cooling jacket around said cooler, and means for recycling nitrogen through said reactor, kiln, and cooling jacket.

2. An apparatus as defined in claim 1, including a duct connecting said kiln and said cooling jacket, and a dust collector in said duct.

3. An apparatus for the continuous nitrogenation of calcium carbide, comprising a stationary vertical turbulence reactor, a grid in the bottom portion of said reactor and extending over the whole cross-section thereof, lateral inlets above said grid to charge calcium carbide into said reactor, a substantially horizontal rotary kiln of larger diameter than said reactor, the upper end of said reactor being bent and opening directly into said kiln, and means to pass nitrogen and calcium carbide from the lower end of said reactor through the reactor and the kiln.

4. The apparatus claimed in claim 3, wherein said discharge end of the reactor is provided with an inlet for the introduction of calcium cyanamide.

References Cited in the file of this patent

UNITED STATES PATENTS

| | | |
|---|---|---|
| 1,143,132 | Peacock | June 15, 1915 |
| 1,332,138 | Newhouse | Feb. 24, 1920 |
| 2,073,105 | Hoffmann | Mar. 9, 1937 |
| 2,180,382 | Winter et al. | Nov. 21, 1939 |
| 2,622,059 | Lesher | Dec. 16, 1952 |
| 2,687,945 | Daniels | Aug. 31, 1954 |
| 2,733,137 | Swaine et al. | Jan. 31, 1956 |